UNITED STATES PATENT OFFICE.

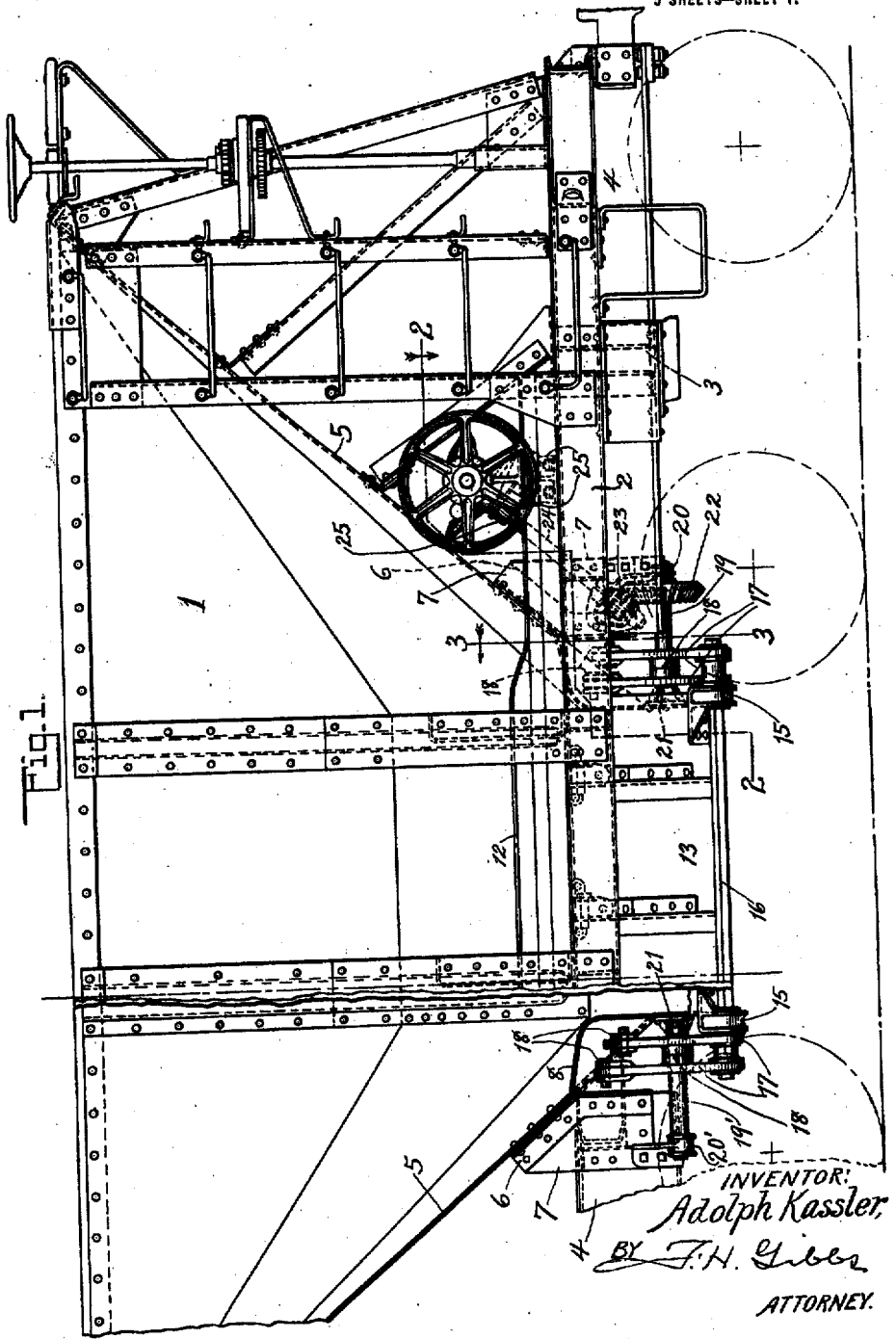

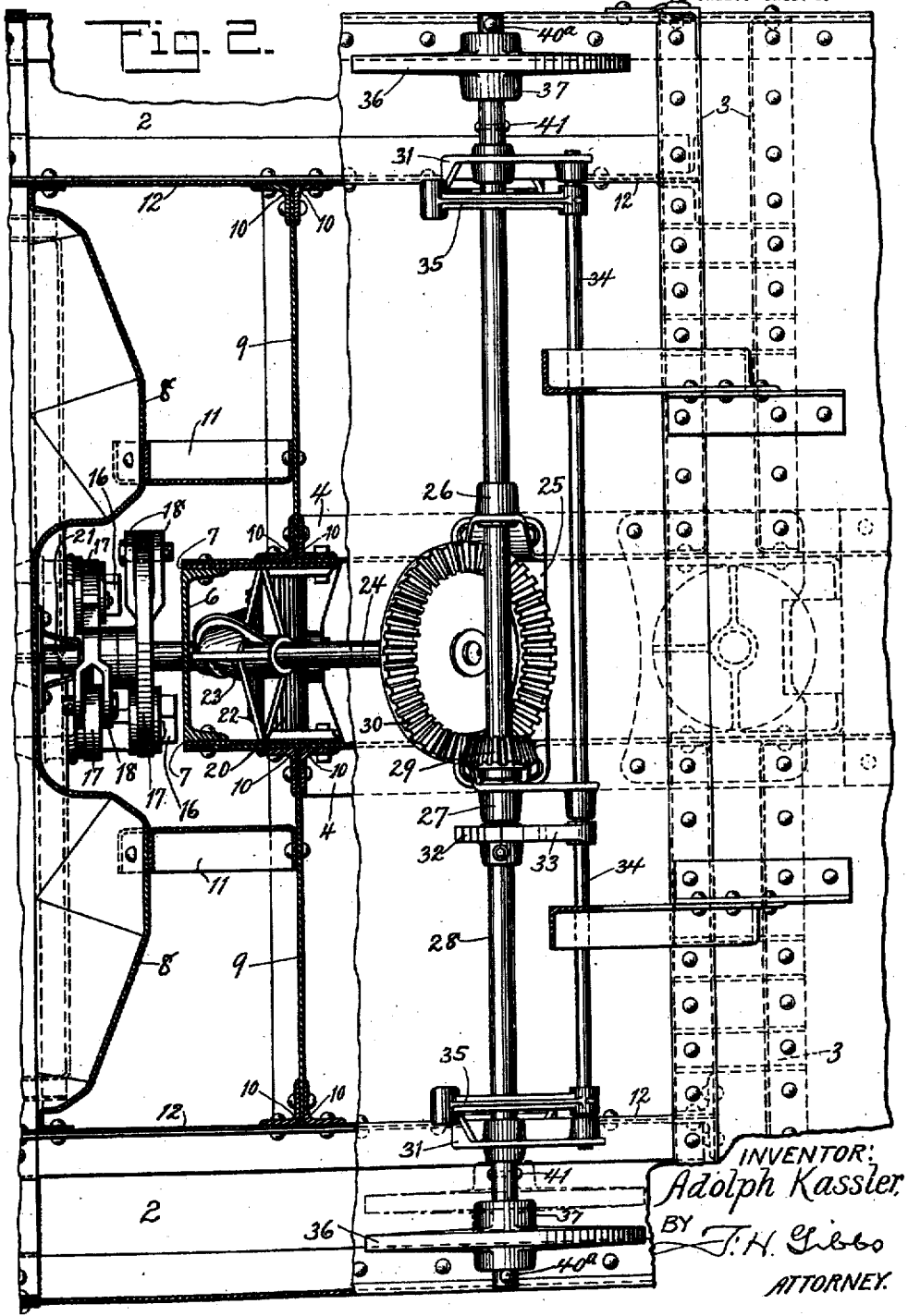

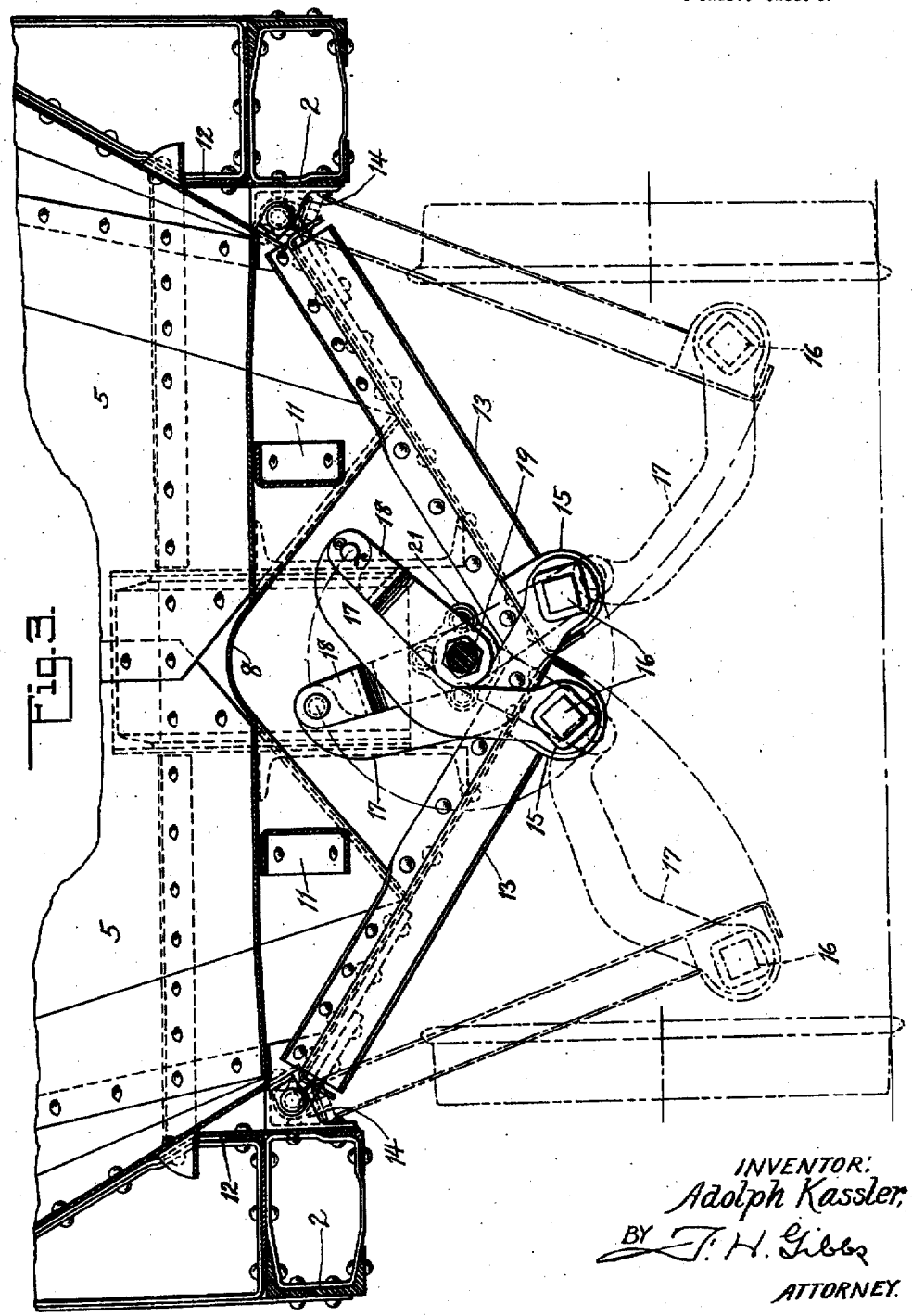

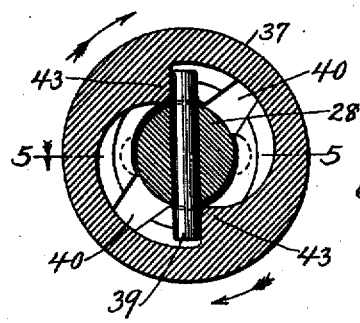
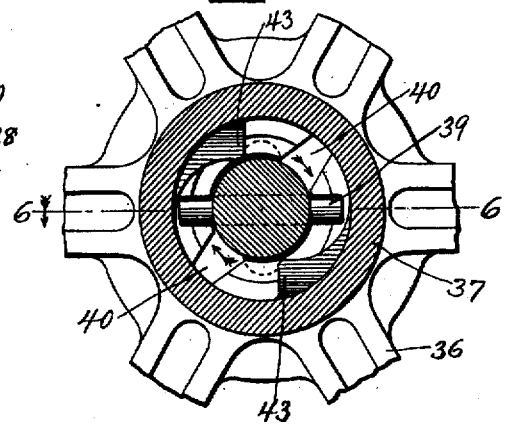
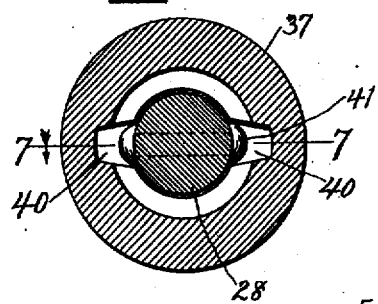
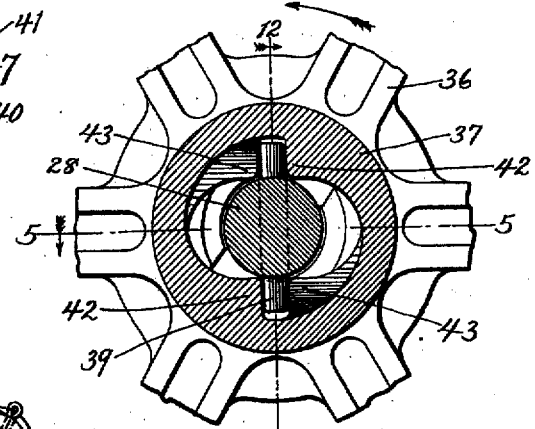
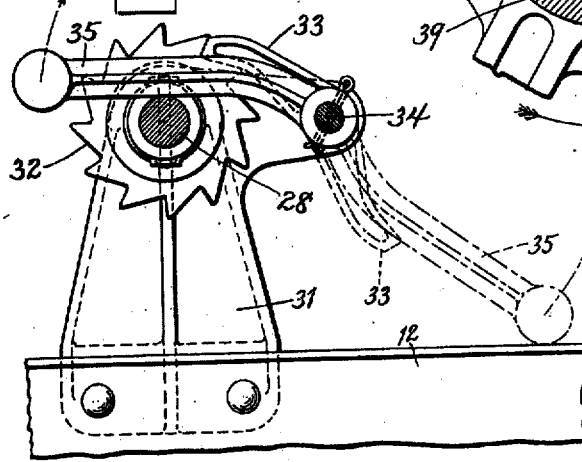

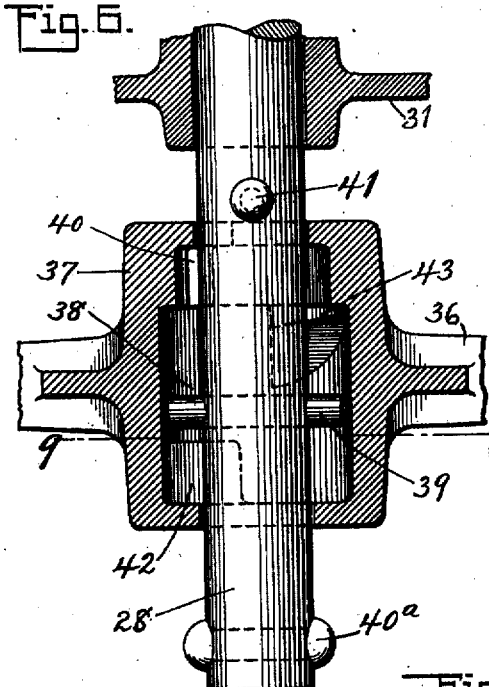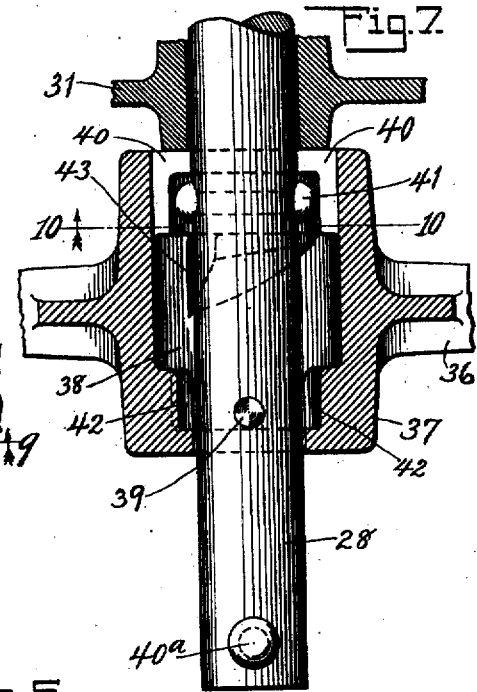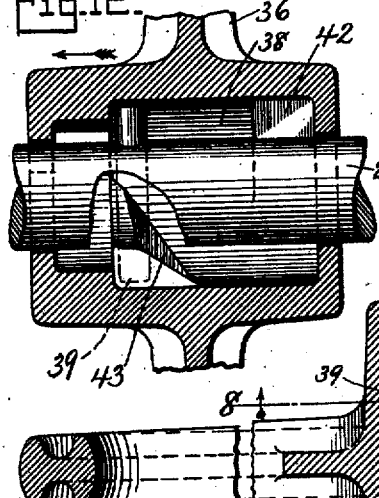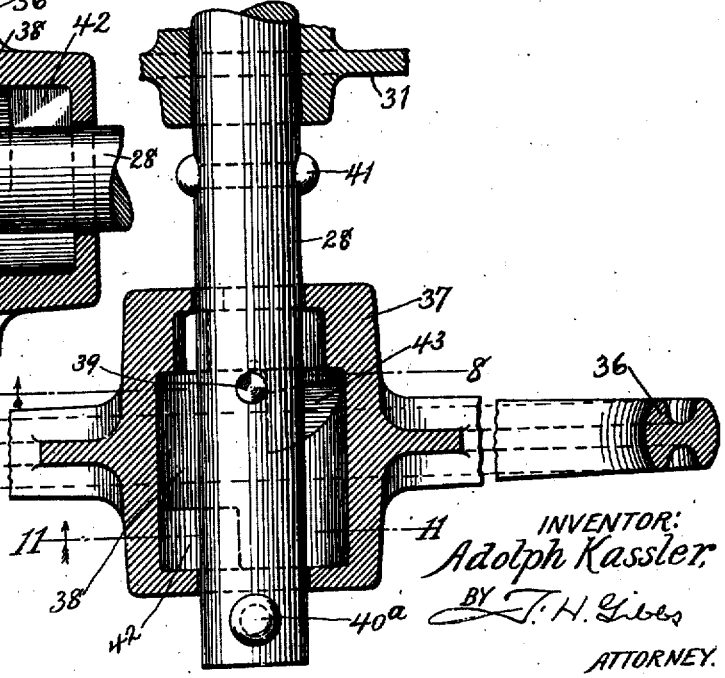

ADOLPH KASSLER, OF NEW YORK, N. Y., ASSIGNOR TO AMERICAN CAR AND FOUNDRY COMPANY, OF NEW YORK, N. Y., A CORPORATION OF NEW JERSEY.

DUMPING CAR.

1,415,097.   Specification of Letters Patent.   Patented May 9, 1922.

Application filed April 30, 1920. Serial No. 377,811.

*To all whom it may concern:*

Be it known that I, ADOLPH KASSLER, residing at 1544 Bryant Avenue, New York, N. Y., and being a citizen of the United States, have invented certain new and useful Improvements in Dumping Cars, of which the following is a full, clear, and exact description, such as will enable others skilled in the art to which it appertains to make and use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a broken view, partly in elevation and partly in section showing my improvement applied to a hopper bottom car of the center dumping type;

Figure 2 is a view partly in plan and partly in section, taken on the line 2—2 of Fig. 1, looking in the direction of the arrow;

Figure 3 is a transverse section taken on line 3—3 of Fig. 1, looking in the direction of the arrow;

Figure 4 is a view showing details of the latch mechanism of the door operating mechanism; and Figures 5 to 12 are views showing the details of the releasable connection between the hand wheel and the main winding shaft of the door operating mechanism; Figs. 5, 6, 7 and 12 showing the hand wheel in different positions with respect to the pin in the shaft with which it engages; Figs. 8, 9 and 11 showing the shoulders in the hub of the hand wheel that engage the pin in the shaft in different positions with respect to the pin and Fig. 10 showing the slotted end of the hand wheel hub. Fig. 5 is a section taken on the line 5—5 of Figs. 8 and 11; Fig. 6 is a section taken on the line 6—6 of Fig. 9; Fig. 7 is a section taken on the line 7—7 of Fig. 10; Fig. 8 is a section taken on the line 8—8 of Fig. 5; Fig. 9 is a section taken on the line 9—9 of Fig. 6; Fig. 10 is a section taken on the line 10—10 of Fig. 7; Fig. 11 is a section taken on line 11—11 of Fig. 5; and Fig. 12 is a section taken on line 12—12 of Fig. 11.

It is an object of my invention to provide an improved dumping car and a further object is to provide an improved dumping door operating mechanism of the type in which the crank arms operating the doors serve to lock the doors in closed position and the means by which the opening movement of the doors is initiated is disconnected from door operating means as soon as the doors are operated by the lading.

In the drawings, 1 designates a car body of the hopper bottom type mounted upon an underframe comprising side sills 2, bolsters 3 joining the side sills and channel draft sills 4 that extend from the end sills, through the body bolsters 3 and end adjacent the end sheets 5 of the car body 1, the webs of the draft sills which extend beyond the flanges being secured to the end sheets by bent channel members 6. To reenforce the bent channel members, plates 7 are placed between the draft sill webs and the flanges of the channel members 6 and are secured thereto. To the lower end of each end sheet 5 is secured a sheet 8 that forms the end sheet of the hopper and is bent to form a housing for part of the door operating mechanism that is mounted beneath it. Channel cross bearers 9 secured to the draft sills and side sill by angles 10 serve to join the draft sills and side sills. Members 11 join the cross bearers 9 and the hopper end sheets 8. As shown in Fig. 3, the members 12 of the side sills, where adjacent to the body side sheets, are bent so as to engage the body side sheets and are riveted thereto.

The hopper is provided with center dumping doors 13 pivotally connected to brackets 14 secured to the side sills 2 and the side sheets of the car body. Mounted in bearings in brackets 15 secured to the car doors are shafts 16 and to each end of each shaft 16 is secured a crank arm 17 which are connected to crank arms 18 secured on stub shafts 19 and 19' mounted in bearings in brackets 20 and 20' carried by draft sills 4 and brackets 21 carried by the hopper end sheets 8. As shown in Fig. 3, the crank arms 18 are angularly displaced on the stub shafts 19—19', thus providing for the proper movement of the doors at the opposite sides of the hopper and the crank arms 17 are bent so as to permit of the crank arms 18 being rotated beyond the plane passing through the axes of the shafts 16 and 19—19' and thus lock the doors in closed position.

Keyed to the shaft 19 is a bevel gear 22 that meshes with a bevel pinion 23 keyed to one end of a shaft 24 that is carried in a bearing in the bearing bracket 20 carried by the draft sills 4, and a bearing in a bracket 25 also carried by the sills 4. The bearing bracket 20 is mounted between the draft sills 4 and serves as a spacing member for the sills 4 and as a housing for the bevel gears 22 and 23 that protects the gears and keeps them properly positioned. The bracket 25 also has bearings 26 and 27 that support a shaft 28 that extends the full width of the car and has keyed thereon a beveled pinion 29 that meshes with a beveled gear 30 keyed to the upper end of the shaft 24. The ends of the shaft 28 are supported in bearings mounted in brackets 31 secured to the side sills 2 of the car. Mounted on the shaft 28 is a ratchet wheel 32 engaged by a pawl 33 fixed on the rod 34 that extends across the car and has bearings in the brackets 31. Fixed to each end of the rod 34 is a weighted arm 35 adapted, as shown in Fig. 4, to hold the pawl either in engagement with the ratchet wheel or away from it and to serve as a convenient operating means for the pawl.

On each end of the shaft 28 there is loosely mounted a hand wheel 36 having a hub 37 containing a chamber 38 of general cylindrical shape and of sufficient diameter to receive the pin 39 fixed in the shaft 28. The inner end of the hub 37 is slotted, as at 40 in Fig. 7, to permit the passage of the pin 39 and the outer end of the hub is bored to permit the end of the shaft to pass therethrough. After the wheel 36 is mounted on the shaft 28 a pin 40° is passed through the shaft and its ends headed, as shown in Figs. 5, 6 and 7, to prevent the withdrawal of the wheel from the shaft. Similar pins 41 serve to keep the shaft 28 in position in its supporting brackets. At each end of the chamber 38 are inwardly extending projections or shoulders 42 and 43, the projections 42 being substantially rectangular in shape while the projections 43 are each provided with an inclined face extending from the base of the projection to the outer edge of the front or engaging face of the shoulder. The projections 42 and 43 are adapted to engage the pin 39 and thus provide a means for rotating the shaft 28 in either direction by means of the hand wheel. The hand wheels and gearing are so arranged that the projections 42 will be engaged with the pin 39 when it is desired to operate the doors to closed position and the projections 43 will be engaged when it is desired to open the doors.

Assuming the doors in closed position and the pawl 33 clear of ratchet wheel 32 to open the doors, the hand wheel 36 is rotated slightly, if necessary, and moved along on the shaft 28 so as to bring the front or engaging faces of the projections 43 into engagement with the pin 39. Rotation of the hand wheel 36 will then cause rotation of the shaft 28 and through the gears and pinions, will cause rotation of the stub shaft 19 upon which gear 22 is keyed. Rotation of the stub shaft 19 will operate the crank arms 18 connected thereto and the crank arms 17 connected to the arms 18. Operating the arms 17 will rotate the shafts 16 mounted on the doors, thus operating the crank arms 17 and 18 and the shaft 19' at the other end of the doors. The operation of the cranks 17 and 18 separates these cranks and destroys the locking effect possessed by them in the closed position of the doors so that the doors are opened quickly by the weight of the load. The doors, opening under the weight of the load, operate the gears and shafts and cause the shaft 28 carrying the pin 39 to revolve at high speed for an instant. Were the hand wheel 36 and shaft 28 positively engaged at this time, the sudden and rapid turning of the hand wheel would result in injury to the operator. Shaft 28 however, being rotated faster than the hand wheel 36 causes the pin 39 to leave the front or engaging face of the projection 43 and to engage the inclined face at the back of the projection and force the hand wheel along the shaft 28 leaving the pin 39 free to turn in chamber 38 in a clear space between the projections 42 and 43. To operate the doors to closed position, the hand wheel 36 is moved on the shaft 28 so as to engage the pin 39 with the projections 42. Rotation of the hand wheel 36 operates the shaft 28 and, through the gears and pinions, operates shaft 19 to operate cranks 18 and 17 and shafts 16 causing the operation of the cranks 17 and 18 and shaft 19' at the opposite end of the door. The operation of the cranks 17 and 18 causes the door to be moved to its closed position and continued operation moves the cranks to the position shown in Fig. 3 in which they serve to hold the hopper doors in closed position.

What I claim is:

1. In a dumping car, dumping doors, shafts on said doors, cranks on said shafts, stub shafts on said car and angularly disposed cranks on each of said stub shafts connected to said first mentioned cranks to operate said doors.

2. In a dumping car, dumping doors, shafts mounted on said doors, a stub shaft mounted on said car, cranks connecting said shafts and adapted to operate said doors, a second stub shaft carried by said car and cranks connecting said second stub shaft and the shafts on the doors and adapted to be operated by the shafts on the doors and to aid in operating the doors.

3. In a dumping car, dumping doors, a shaft on each door, a crank connected to each shaft to rotate each shaft and operate each door, a crank operated by each shaft to aid in operating each door and means operating the first mentioned crank on each shaft and adapted to be disconnected when the doors are operated by the load.

4. In a dumping car, dumping doors, shafts mounted on said doors, a stub shaft mounted on said car, cranks connecting said shafts and adapted to rotate said shafts and operate said doors, a second stub shaft carried by said car, cranks connecting said second stub shaft and the shafts on said doors and adapted to be operated by the shafts on said doors and to aid in operating said doors and an operating means for said first stub shaft comprising a hand wheel adapted to be disconnected from said operating means when said doors are operated by the load.

5. In a dumping car, dumping doors and operating means for said dumping doors comprising a rotatable shaft, a projection on said shaft and means engaging said projection to initiate the operation of said doors, said projection engaging said means to shift said means clear of said projection when the doors are operated by the load.

6. In a dumping car, dumping doors, and operating means for said dumping doors comprising a rotatable shaft and means rotatably mounted and longitudinally movable on said shaft and adapted to engage said shaft in one position to initiate the lowering of said doors and to rotate freely on said shaft in another position.

7. In a dumping car, dumping doors and operating means for said dumping doors comprising a rotatable shaft and a hand wheel rotatably mounted on said shaft and adapted to rotate said shaft in opposite directions and engaging means on said hand wheel and shaft adapted to move said wheel to a position in which it may rotate freely on said shaft.

8. In a dumping car, dumping doors and operating means for said dumping doors comprising a rotatable shaft and a hand wheel having a chambered hub and movable longitudinally of said shaft and engaging means on said shaft and in the chamber of said hub adapted to engage to initiate the opening movement of said doors and to engage to move said hand wheel to a position in which said shaft may revolve freely in said hub.

9. In a dumping car, dumping doors and operating means for said dumping doors comprising a rotatable shaft and a hand wheel having a chambered hub and movable longitudinally on said shaft and projections in said hub chamber adapted to engage said shaft to rotate said shaft in opposite directions, some of said projections being also adapted when engaged by said shaft to move said hand wheel to a position in which said shaft may revolve freely in said hub.

10. In a dumping car, dumping doors and operating means for said dumping doors comprising a rotatable shaft and means movably mounted on said shaft and adapted in one position to engage said shaft to raise said doors, in another position to engage said shaft to initiate the lowering of said doors and in another position to rotate freely on said shaft.

11. In a dumping car, dumping doors and operating means therefor comprising a rotatable shaft, projections on said shaft, operating means for said shaft rotatably mounted thereon and adapted to engage said projections to operate said shaft, said projections being adapted to move said shaft operating means to disengaging position when the doors are operated by the load.

12. In a dumping car, dumping doors and operating means therefor, comprising a rotatable shaft, projections on said shaft, a hand wheel, for operating said shaft, rotatably mounted on said shaft and having a chambered hub provided with inwardly extending projections adapted to engage the projections on the shaft and inclined surfaces on the projections on the hub adapted to be engaged by the projections on the shaft to move the hand wheel from engaging position when the doors are operated by the load.

13. In a dumping car, dumping doors and operating means therefor comprising a rotatable shaft, projections on said shaft, a hand wheel for operating said shaft rotatably mounted on said shaft and having a chambered hub provided with inwardly extending projections adapted to engage said projections on the shaft for operating said shaft to raise the doors and other inwardly extending projections adapted to engage said projections on the shaft to initiate the opening of said doors, said other projections having inclined surfaces adapted to be engaged by the projections on the shaft to shift the hand wheel on the shaft when the doors are operated by the load during the opening movement of said doors.

14. In a dumping car, dumping doors and operating means for said dumping doors comprising a rotatable shaft, a projection on said shaft and means on said shaft engaging said projection to initiate the lowering of said doors and adapted to be shifted out of the path of said projection by engagement with said projection when the doors are operated by the load.

15. In a dumping car, dumping doors, shafts on said doors, cranks carried by said shafts, stub shafts carried by the car frame at the ends of said doors, cranks carried by said stub shafts and connected to said first mentioned cranks and means to operate one of said stub shafts to operate the doors.

16. In a dumping car, dumping doors, shafts on said doors, cranks carried by said shafts, stub shafts carried by the car frame and cranks on said stub shafts connected to said first mentioned cranks, one stub shaft serving to operate said cranks and the other stub shaft being operated by said cranks.

17. In a dumping car, dumping doors at each side of the car, a shaft on the doors at each side, cranks on said shafts, stub shafts mounted on the car at each end of said doors and cranks on said stub shafts connected to said first mentioned cranks to operate said doors.

18. In a dumping car, dumping doors and operating means for said dumping doors comprising a rotatable shaft, a projection on said shaft and means engaging said projection to initiate the operation of said doors and adapted to be shifted by said projection to permit free rotation of said shaft when the doors are operated by the load.

19. In a dumping car, dumping doors, shafts on the free edges of said doors, cranks on said shafts, shafts at each end of said doors and cranks on said second shafts connected to said first mentioned cranks.

In witness whereof I have hereunto set my hand in the presence of two witnesses.

ADOLPH KASSLER.

Witnesses:
 JOSEPHINE MITCHELL,
 R. W. SMITH.